ively, to drive the actuator, and for outputting a control signal to the control valve in response to the displacement signal in order to stop the actuator at a predetermined position. When either one of the servomechanism is damaged, the control of the control surface by the damaged servomechanism is released, and when all the servomechanisms are damaged, the free motion of the control surface is regulated.

United States Patent [19]
Ako

[11] Patent Number: 4,905,933
[45] Date of Patent: Mar. 6, 1990

[54] CONTROL APPARATUS OF CONTROL SURFACE OF AIRCRAFT

[75] Inventor: Hidenobu Ako, Ogaki, Japan

[73] Assignee: Teijin Seiki Company Limited, Osaka, Japan

[21] Appl. No.: 187,247

[22] Filed: Apr. 28, 1988

[30] Foreign Application Priority Data

Aug. 7, 1987 [JP] Japan .................................. 62-197534

[51] Int. Cl.$^4$ ............................................. B64C 13/12
[52] U.S. Cl. ................................................. 244/75 R
[58] Field of Search ............... 244/75 A, 78, 226, 227, 244/223, 75 R; 91/509–511, 440

[56] References Cited

U.S. PATENT DOCUMENTS

| | | | |
|---|---|---|---|
| 3,363,514 | 1/1968 | Ramcke | 91/405 |
| 3,911,942 | 10/1975 | Becker | 91/509 X |
| 4,079,906 | 3/1978 | Durandeau | 244/226 X |
| 4,394,999 | 7/1983 | Botzler | 244/226 X |
| 4,496,121 | 1/1985 | Berlin | 244/75 A |
| 4,736,811 | 4/1988 | Marsden et al. | 60/405 X |
| 4,744,532 | 5/1988 | Ziegler et al. | 244/75 R |

FOREIGN PATENT DOCUMENTS 1204158  10/1967  United Kingdom ................. 91/511

Primary Examiner—Sherman D. Basinger
Assistant Examiner—Anne Sartelle
Attorney, Agent, or Firm—Cushman, Darby & Cushman

[57] ABSTRACT

A control apparatus of a control surface of aircraft comprising a plurality of servomechanisms each including a hydraulic working oil source for supplying working oil under pressure, an actuator for driving the control surface, a servo valve for controlling the control surface, a switch valve interposed between the hydraulic working oil source and the servo valve, a bypass valve interposed between the servo valve and the actuator, a control valve connected to the bypass valve, actuator-displacement detecting means connected to the actuator to detect a drive displacement of the actuator and to output a displacement signal, and a control circuit for outputting actuating signals to the switch valve and servo valve, respect 6 Claims, 6 Drawing Sheets

CONTROL APPARATUS OF CONTROL SURFACE OF AIRCRAFT

FIELD OF THE INVENTION

The present invention relates in general to a control apparatus of control surfaces such as ailerons, elevators and rudders of aircraft, and in particular to such surfaces which are actuated by parallel-redundant servo mechanisms.

DESCRIPTION OF THE PRIOR ART

Recently, the maneuvering system with the fly-by-wire method and hydraulic system in aircraft have been multiplexed to reduce rate of faults in the maneuvering system and hydraulic system, thereby obtaining maximum functional reliability in the control of control surfaces such as ailerons and the like of the aircraft. The example shown in FIG. 5 is representative for a conventional hydraulic servomechanism which is multiplexed and comprises first and second servomechanisms generally designated by reference numerals 9A and 9B, respectively. In FIG. 5, a control surface or aileron 1 is connected with actuators 2A and 2B which are arranged in parallel relationship to each other. The actuators 2A and 2B are connected with control circuits 4A and 4B, respectively, which in turn are connected to a pilot stick or flight computer 3. In accordance with the commands of the pilot stick or flight computer 3, the control circuits 4A, 4B and the actuators 2A and 2B are actuated, and the actuators 2A and 2B drive and control the control surface 1 by the supply of hydraulic working oil from hydraulic working oil sources 5A and 5B. In the case that either one of these hydraulic servomechanisms 9A and 9B, for example, the first hydraulic servomechanism 9A is damaged, the actuator 2A of the damaged servomechanism 9A interferes with the operation of the actuator 2B of the normal servomechanism 9B, so that there is the possibility that the proper control of the control surface 1 cannot be ensured. For this reason, fault-detecting control circuits 6A and 6B, which are entirely independent of one another, are provided in the first and second servomechanisms 9A and 9B, respectively, to detect the actuator of the mechanism damaged and to prevent the same from interfering with the operation of a normal actuator.

A generally known control apparatus of a control surface of aircraft comprises multiplexed servomechanisms, only one being shown in FIG. 6. The servomechanism includes a double-acting actuator 10 having a piston 13 which is slidably received in a cylinder 11 and which is connected through a rod 12 to a control surface or aileron 1 (not shown). The cylinder 11 of the double-acting actuator 10 is divided into a pair of cylinder chambers 11a and 11b by the piston 13. The cylinder chambers 11a and 11b are supplied with hydraulic working oil of a hydraulic working oil source 14 through a switching valve 15, a servo valve 16 and a bypass valve 17, which are disposed in the recited order between the hydraulic working oil source 14 and actuator 10. The admission of the hydraulic working oil to one or the other chamber of the cylinder 11 causes the piston 13 to be reciprocated within the cylinder 11 to drive and control the control surface 1 of the aircraft (not shown). A control circuit 18 for controlling the actuator 10 receives a signal from the aforesaid pilot stick or flight computer 3 and a signal from a transducer 19 which is connected with the rod 12 of the piston 13 and thus serves to detect displacement of the piston 13, and outputs a signal to the servo valve 16, thereby actuating the same. A fault-detecting control circuit 20 serves to detect faults in the servomechanism and to output a signal to the switching valve 15, thereby shifting the switching valve 15 to the position X thereof in which the hydraulic working oil of the hydraulic working oil source 14 is cut off. The switching valve 15 is normally shifted to the position IX thereof, in which the hydraulic working oil is allowed to pass therethrough, and supplies the hydraulic working oil of the hydraulic working oil source 14 to the servo valve 16. At the same time, the supply pressure of the hydraulic working oil of the switching valve 15 is supplied through a pilot conduit 21 to the bypass valve 17 and causes the bypass valve 17 to be shifted to the position XI thereof, in which the hydraulic working oil is allowed to pass through the bypass valve 17, against a spring 17a provided in the bypass valve 17. The servo valve 16 is shiftable to the positions XIII, N and XIV thereof in accordance with the signal from the actuator-controlling circuit 18. When the servo valve 16 is in the position XIV, the hydraulic working oil from the switching valve 15 is supplied through the bypass valve 17 to the left-hand side cylinder chamber 11a, so that the piston 13 is driven to move rightward of FIG. 6 and therefore the working oil in the right-hand side cylinder chamber 11b is discharged therefrom and returns through the bypass valve 17 and the servo valve 16 back to an oil tank 22. Likewise, when the servo valve 16 is in the position XIII, the working oil is supplied to the right-hand side cylinder chamber 11b, the piston 13 is caused to move leftward of FIG. 6, and the working oil in the left-hand side cylinder chamber 11a is discharged. Further, when the transducer 19 detected that the piston 13 was moved to a predetermined position, the signal from the actuator-controlling circuit 18 to the servo valve 16 is interrupted and therefore the servo valve 16 is shifted to the neutral position N. As a result of the neutral position N of the servo valve 16, the supply of the working oil to the actuator 10 is interrupted and the piston 13 is stopped, at the predetermined position. Thus, the control surface 1 has been controlled in accordance with the command of the fly computer 3.

In the event the aforementioned servomechanism is damaged, the fault-detecting control circuit 20 detects the fault and interrupts the signal to the switching valve 15, as already described. As a result, the switching valve 15 is shifted to the position X where the working oil from the hydraulic working oil source 14 is cut off. At the same time, since the supply of the working oil to the bypass valve 17 is interrupted, the bypass valve 17 is shifted to the position XII by the spring 17a provided in the valve 17, and therefore the cylinder chambers 11a and 11b of the actuator 10 are communicated with each other through the bypass valve 17. That is, the actuator 10 becomes in a bypass condition on the hydraulic circuit. For this reason, this actuator in general will not have an unfavorable effect on the normal operations of the other servomechanisms that are connected to the control surface in parallel relationship with the damaged servomechanism. In addition, in the case the supply pressure of the hydraulic working oil source 14 was reduced abnormally because of the fault in the hydraulic working oil source 14, the bypass valve 17 is also automatically shifted to the position XII, in which the supply of the working oil to the actuator 10 is interrupted, by the spring 17a. Therefore, the fault in the hydraulic working oil source 14 also will not have an effect on the normal operations of the other servomechanisms.

In the event all the servomechanisms are damaged, for example, in the event the actuations of both the actuators 2A and 2B in FIG. 5 are interrupted, the rigidity of the control surface 1 is reduced and therefore there occurs fluttering phenomenon resulting from the vibration of the control surface 1 caused by aerodynamic disturbance. For this reason, a mass-balance weight member 7 or damper 8 is fixed to the control surface 1, as shown in FIG. 5, to alleviate the vibration of the control surface 1 and to prevent an occurrence of fluttering phenomenon. However, there is the drawback that the weight of the aircraft is increased due to the mass-balance weight member or damper and furthermore the mechanical efficiency in the control of control surfaces is reduced since the resistance of the control surface becomes unduly large at the time of normal operation.

Accordingly, the object of the present invention is to provide a control apparatus of a control surface of aircraft in which the weight of the aircraft is reduced and the mechanical efficiency in the control of the control surface is enhanced.

SUMMARY OF THE INVENTION

In accordance with one important aspect of the present invention, there is provided a control apparatus of a control surface of aircraft comprising a plurality of servomechanisms each including a hydraulic working oil source for supplying working oil under pressure, an actuator for driving the control surface which has chambers and is connected to the control surface, a bypass valve interposed between the hydraulic working oil source and the actuator and shiftable between a first position thereof, in which the working oil is supplied to the actuator, and a second position thereof, in which the working oil is cut off and the chambers are held in fluid communication with each other through a bypass conduit connected to the bypass valve in order to release the control of the control surface, and a control valve provided in the bypass conduit of the bypass valve and shiftable between a first position, in which the entire working oil in the bypass conduit is allowed to pass through the control valve so that the control surface becomes freely movable, and a second position thereof, in which the working oil in the bypass conduit is restricted so as to regulate the motion of the control surface connected to the actuator, when either one of the servomechanisms is damaged, the control of the control surface by the damaged servomechanism being released by, in the damaged servomechanism, shifting the bypass valve to the second position thereof by the damaged servomechanism and the control valve to the first position thereof by the other servomechanism, and when all the servomechanisms are damaged, the free motion of the control surface being regulated by, in all the servomechanisms, shifting the bypass valve and the control valve to the second position of the bypass valve and the second position of the control valve, respectively.

In accordance with another important aspect of the present invention, there is provided a control apparatus of a control surface of aircraft comprising a pair of first and second servomechanisms each including a hydraulic working oil source for supplying working oil under pressure, an actuator for driving the control surface which has a piston slidably received in a cylinder, and a piston rod fixed to the piston, the cylinder being divided into a pair of first and second cylinder chambers by the piston, the actuator being connected through the piston rod to the control surface, a servo valve for controlling the control surface which is shiftable between a first position thereof, in which the working oil is supplied to either one of the pair of cylinder chambers to change a driving direction of the actuator, and a second position, in which supply of the working oil to the actuator is interrupted to stop the drive of the actuator, a switch valve interposed between the hydraulic working oil source and the servo valve and shiftable between a first position thereof, in which the working oil from the hydraulic working oil source is supplied to the servo valve, and a second position thereof, in which the supply of the working oil is cut off, a bypass valve interposed between the servo valve and the actuator, actuated by means of a pilot pressure in the switch valve introduced thereto through a pilot conduit between the switch valve and the bypass valve, and shiftable between a first position thereof, in which when the switch valve is shifted to the first position thereof, the working oil from the servo valve is supplied to the actuator, and a second position thereof, in which when the switch valve is shifted to the second position, the working oil from the servo valve is cut off and the first and second cylinder chambers are held in fluid communication with each other through a bypass conduit connected to the bypass valve in order to release the control of the control surface, a control valve provided in the bypass conduit of the bypass valve and shiftable between a first position, in which the entire working oil in the bypass conduit is allowed to pass through the control valve so that the control surface becomes freely movable, and a second position thereof, in which the working oil in the bypass conduit is restricted so as to regulate the motion of the control surface connected to the piston rod of the actuator, and a control circuit for outputting to the switch valve a first control signal for cutting off the supply of the working oil and for outputting to the control valve a second control signal for shifting the control valve to the first position thereof and a third control signal for shifting the control valve to the second position thereof, when either one of the servomechanisms is damaged, the control of said control surface by the damaged servomechanism being released by outputting the first control signal of the control circuit of the one damaged servomechanism to the switch valve of the one damaged servomechanism and outputting the second control signal of the control circuit of the other servomechanism to the control valve of the one damaged servomechanism, and when both first and second servomechanisms are damaged, the free motion of the control surface being regulated by outputting the first control signal of the first servomechanism to the switch valve of the first servomechanism and the third control signal of the second servomechanism to the control valve of the first servomechanism and by outputting the first control signal of the second servomechanism to the switch valve of the second servomechanism and the third control signal of the first servomechanism to the control valve of the second servomechanism.

The switch valve may be provided with a solenoid and the control valve is provided with a solenoid, and the control circuit may comprise a power source, a first switch, and a second switch which is opened and closed when the first switch is closed and opened, respectively, the solenoid of the switch valve of the first servomechanism being electrically connected through the first switch of the first servomechanism to the power source of the first servomechanism, and the solenoid of the control valve of the first servomechanism being electrically connected through the second switch of the first servomechanism and through the first switch of the second servomechanism to the power source of the second servomechanism.

The switch valve may also be provided with a solenoid and the control valve is provided with a solenoid, the control circuit may also comprise a power source and a switch, the solenoid of the switch valve of the first servomechanism being electrically connected through the switch of the first servomechanism to the power source of the first servomechanism, and the solenoid of the control valve of the first servomechanism being electrically connected through the switch of the second servomechanism to the power source of the second servomechanism.

In accordance with another important aspect of the present invention, there is provided a control apparatus of a control surface of aircraft comprising a plurality of servomechanisms each including a hydraulic working oil source for supplying working oil under pressure, an actuator for driving the control surface which has a piston slidably received in a cylinder, and a piston rod fixed to the piston, the cylinder being divided into a pair of cylinder chambers by the piston, the actuator being connected through the piston rod to the control surface, a servo valve for controlling the control surface which is shiftable between a first position thereof, in which the working oil is supplied to either one of the pair of cylinder chambers to change a driving direction of the actuator, and a second position, in which supply of the working oil to the actuator is interrupted to stop the drive of the actuator, a switch valve interposed between the hydraulic working oil source and the servo valve and shiftable between a first position thereof, in which the working oil from the hydraulic working oil source is supplied to the servo valve, and a second position thereof, in which the supply of the working oil is cut off, a bypass valve interposed between the servo valve and the actuator, actuated by means of a pilot pressure in the switch valve introduced thereto through a pilot conduit between the switch valve and the bypass valve, and shiftable between a first position thereof, in which when the switch valve is shifted to the first position thereof, the working oil from the servo valve is supplied to the actuator, and a second position thereof, in which when the switch valve is shifted to the second position, the working oil from the servo valve is cut off and the first and second cylinder chambers are held in fluid communication with each other through a bypass conduit connected to the bypass valve in order to release the control of the control surface, a control valve provided in the bypass conduit of the bypass valve and shiftable between a first position, in which the entire working oil in the bypass conduit is allowed to pass through the control valve so that the control surface becomes freely movable, and a second position thereof, in which the working oil in the bypass conduit is restricted so as to regulate the motion of the control surface connected to the piston rod of the actuator, and a first control circuit for outputting to the switch valve a first control signal for cutting off the supply of the working oil and for outputting to the control valve a second control signal for shifting the control valve to the first position thereof and a third control signal for shifting the control valve to the second position thereof, when either one of the servomechanisms is damaged, the control of the control surface by the damaged servomechanism being released by outputting the first control signal of the control circuit of the one damaged servomechanism to the switch valve of the one damaged servomechanism and outputting the second control signal of the control circuit of the other servomechanism to the control valve of the one damaged servomechanism, and when all the servomechanisms are damaged, the free motion of the control surface being regulated by shifting the control valve to the second position thereof in all the servomechanisms.

The control valve of each servomechanism may be provided with a solenoid, and in which the control circuit of each servomechanism comprises a power source and a switch, and the solenoid of the control valve of each servomechanism may be constituted by a plurality of solenoids corresponding in number to the plurality of the servomechanisms, the respective solenoid of the plurality of solenoids being connected electrically through the corresponding switch to the corresponding power source.

BRIEF DESCRIPTION OF THE DRAWINGS

The drawbacks of a prior-art control apparatus of a control surface of aircraft and the features and advantages of a control apparatus of a control surface of aircraft according to the present invention will be more clearly understood from the following description taken in conjunction with the accompanying drawings in which.

DETAILED DESCRIPTION OF THE PREFERRED EMBODIMENTS

Figure 1:
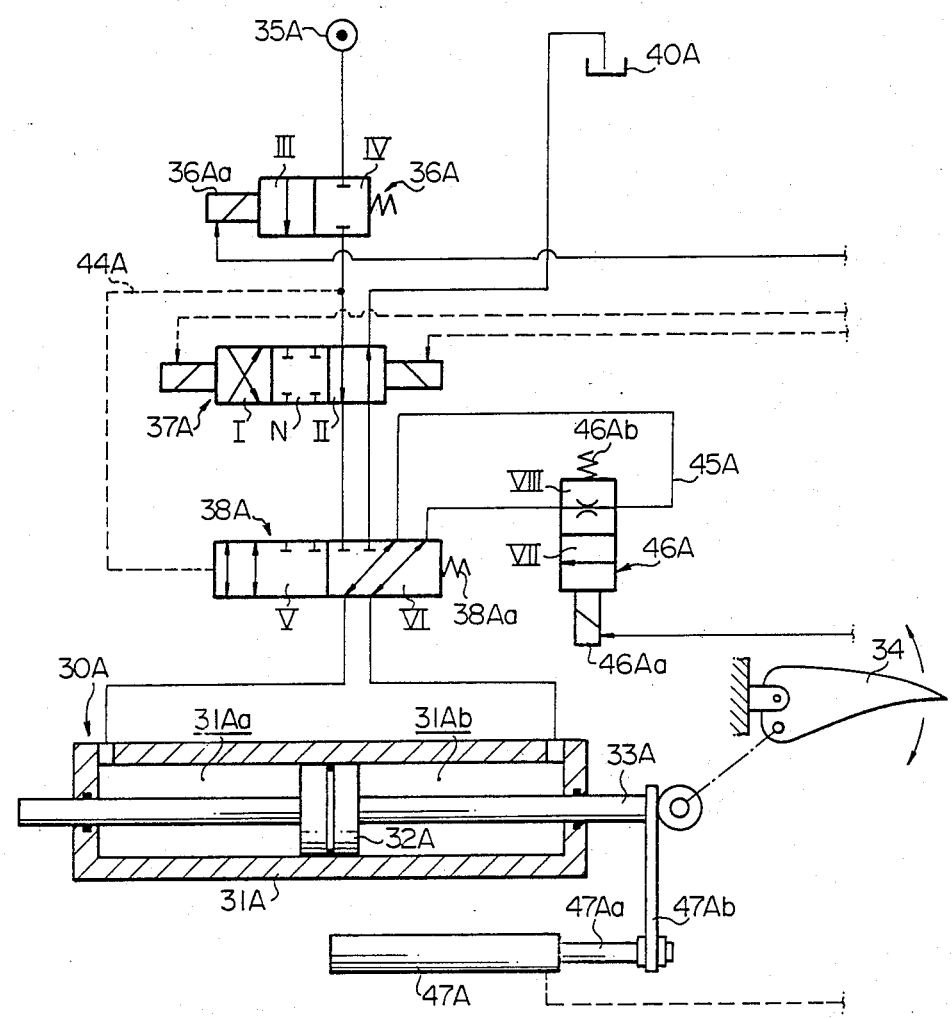
FIG. 1 is an enlarged schematic view showing the construction of one of a pair of servo control circuits shown in FIG. 2.
Figure 2:
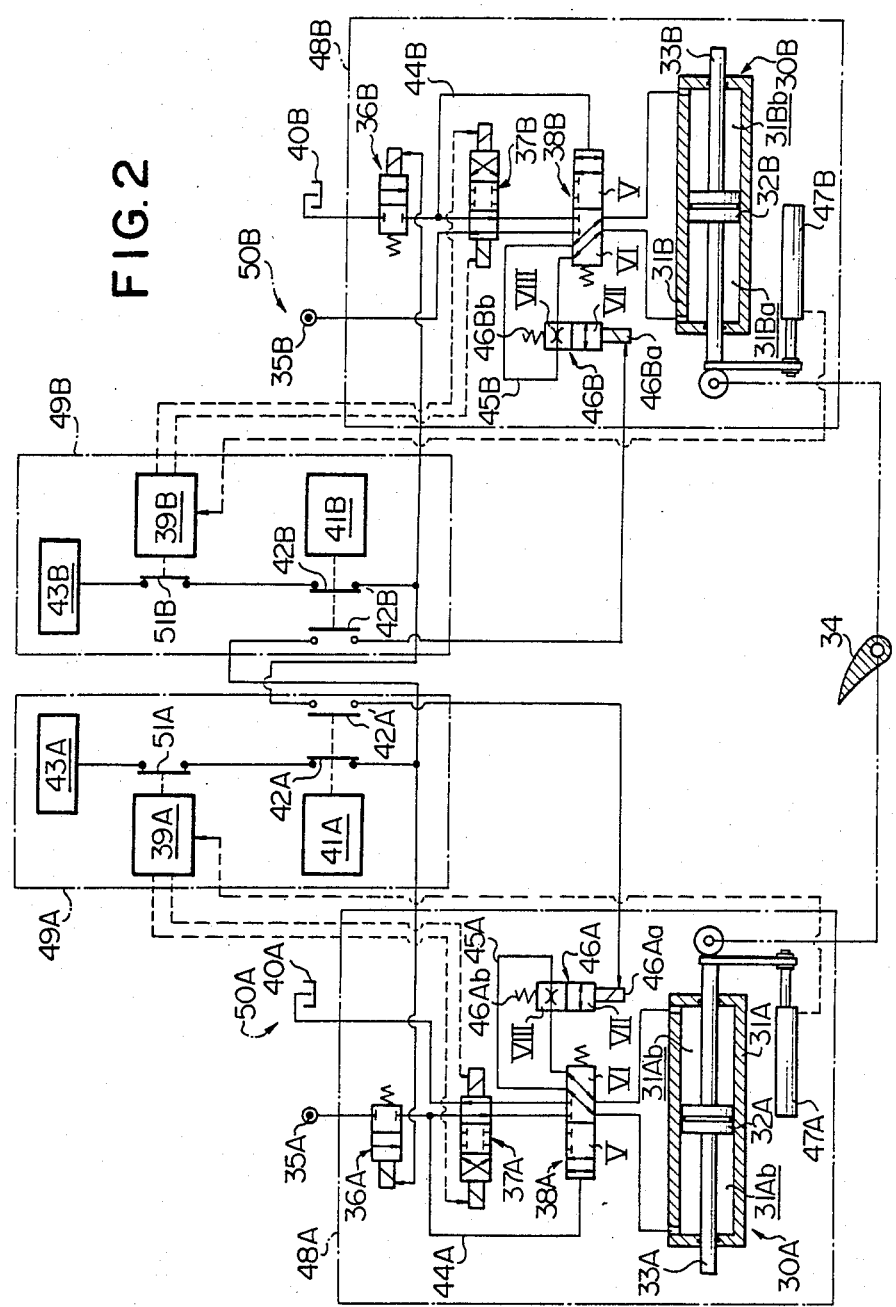
FIG. 2 is a schematic view showing the over-all construction of a control apparatus of a control surface of aircraft, which is designed in accordance with one embodiment of the present invention.

Referring now in detail to the drawings and initially to FIGS. 1 and 2, there is shown one embodiment of the control apparatus of a control surface of aircraft in accordance with the present invention. The control apparatus comprises a hydraulic working oil source or pump 35A for supplying working oil or fluid under pressure, and a pair of first and second servomechanisms generally designated by reference numerals 50A and 50B, as shown in FIG. 2. The first servomechanism 50A of FIG. 2 is substantially identical in construction and operation to the second servomechanism 50B, and therefore only the former will hereinafter be described in detail. The first servomechanism 50A largely consists of a servo hydraulic circuit 48A for driving and controlling a double-acting actuator 30A, and an electrical control circuit 49A for detecting a fault in the servo hydraulic circuit 48A.

Referring to FIG. 1, the aforesaid servo hydraulic circuit 48A comprises the double-acting actuator 30A for driving a control surface or aileron 34 of aircraft, and switch, servo and bypass valves 36A, 37A and 38A which are disposed in the recited order between the hydraulic working oil source 35A and double-acting actuator 30A.

The double-acting actuator 30A has a piston 32A slidably received in a cylinder 31A, and a piston rod 33A fixed to the piston 32A. The piston rod 33A of the actuator 30A is connected to the control surface 34 of aircraft by suitable means, as shown in FIG. 1. The cylinder 31A is divided into a pair of cylinder chambers 31Aa and 31Ab by the piston 32A. The cylinder chambers 31Aa and 31Ab are supplied with the hydraulic working oil of the hydraulic working oil source 35A through the switch valve 36A, servo valve 37A and bypass valve 38A. The admission of the hydraulic working oil to one cylinder chamber 31Aa or the other cylinder chamber 31Ab of the cylinder 31A causes the piston 32A to be reciprocated within the cylinder 31A to drive and control the control surface 34A. The servo valve 37A receives a signal from an actuator-controlling circuit 39A shown in FIG. 2 in accordance with the command of a pilot stick or flight computer (not shown), and supplies the working oil to one cylinder chamber 31Aa or the other cylinder chamber 31Ab, thereby changing the moving or driving direction of the actuator 30A. Further, the servo valve 37A serves to interrupt the supply of the hydraulic working oil to stop the actuation of the actuator 30A. More particularly, when the servo valve 37A is shifted to the position I thereof in accordance with the signal from the actuator-controlling circuit 39A, the hydraulic working oil from the switch valve 36A is supplied through the bypass valve 38A to the right-hand side cylinder chamber 31Ab of the actuator 30A, so that the piston 32A is driven to move leftward of FIG. 1 and therefore the working oil in the left-hand side cylinder chamber 31Aa is discharged therefrom and returns through the bypass valve 38A and servo valve 37A back to an oil tank 40A. When, on the other hand, the servo valve 37A is shifted to the position II thereof in accordance with the signal from the actuator-controlling circuit 39A, the hydraulic working oil from the switch valve 36A is supplied through the bypass valve 38A to the left-hand side cylinder chamber 31Aa of the actuator 30A, so that the piston 32A is driven to move rightward of FIG. 1 and therefore the working oil in the right-hand side cylinder chamber 31Ab is discharged therefrom and returns through the bypass valve 38A and servo valve 37A back to the oil tank 40A. Further, when the servo valve 37A is shifted to the neutral position N thereof wherein the working oil is cut off, the supply of the working oil to the actuator 30A is interrupted and the piston 32A of the actuator 30A is stopped. Thus, the actuator 30A serves to drive and stop the control surface 34A in accordance with the signal from the actuator-controlling circuit 39A, and the control surface 34A is controlled in accordance with the command of the pilot stick or flight computer.

The aforesaid switch valve 36A is interposed between the hydraulic working oil source 35A and the servo valve 37A and is provided with a solenoid 36Aa. The solenoid 36Aa of the switch valve 36A is connected to a power source 43A through a first switch 42A provided in a fault-detecting control circuit 41A. When the fault-detecting control circuit 41A closes the switch 42A, i.e., when a signal is input to the switch valve 36A, the switch valve 36A is shifted to the position III thereof, in which the working oil is allowed to pass through the valve 36A, and thus the working oil is supplied from the hydraulic working oil source 35A to the servo valve 37A. When, on the other hand, the fault-detecting control circuit 41A opens the switch 42A, i.e., when a signal to the switch valve 36A is interrupted, the switch valve 36A is shifted to the position IV thereof, in which the working oil is cut off, and thus the supply of the working oil to the servo valve 37A is interrupted.

The aforesaid bypass valve 38A is interposed between the servo valve 37A and the actuator 30A and is actuated by pilot pressure in the switch valve 36A which is supplied to the bypass valve 38A through a pilot conduit 44A. More particularly, while the switch valve 36A is supplying the hydraulic working oil of the hydraulic working oil source 35A to the servo valve 37A, the pilot pressure in the switch valve 36A is directed through the pilot conduit 44A to the bypass valve 38A, and therefore the bypass valve 38A is caused to shift to the position V thereof, in which the working oil is allowed to pass through the valve 38A, against a spring 38Aa provided in the valve 38A, and the working oil is supplied from the servo valve 37A to the actuator 30A. When, on the other hand, the switch valve 36A is shifted to the position IV and thus the working oil is cut off, the bypass valve 38A is shifted to the position VI thereof, and therefore the pair of the cylinder chambers 31Aa and 31Ab of the actuator 30A are communicated with each other through a bypass conduit 45A communicated to the bypass valve 38A. Since the working oil within these cylinder chambers 31Aa and 31Ab is bypassed, the motion of the control surface 34A connected to the actuator 30A becomes free, and the bypass valve 38A releases the control of the control surface 34.

The aforementioned servo hydraulic circuit 48A further comprises a control valve 46A which is connected to the bypass conduit 45A of the bypass valve 38A and provided with a solenoid 46Aa. As shown in FIG. 2, the solenoid 46Aa of the control valve 46A is connected through a second switch 42A', which is provided in the fault-detecting control circuit 41A and actuated in combination with the switch 42A, through a first switch 42B of the second servomechanism 50B, which is provided in a fault-detecting control circuit 41B, and through a main switch 51B of the second servomechanism 50B, which is provided in an actuator-controlling circuit 39B, to a power source 43 of the second servomechanism 50B. When the fault-detecting control circuit 41A closes the second switch 42A', i.g., when a signal is input to the control valve 46A, the control valve 46A is shifted to the position VII thereof, wherein the bypass conduit 45A is fully opened and the entire working oil in the bypass conduit 45A is allowed to pass through the control valve 46A, against a spring 46Ab provided in the control valve 46A. When, on the other hand, the fault-detecting control circuit 41A opens the second switch 42A', i.g., when a signal to the control valve 46A is interrupted, the control valve 46A is shifted to the position VIII thereof, wherein the flow of the bypass conduit 45A is choked or restricted, by means of the spring 46Ab.

The aforementioned servo hydraulic circuit 48A further comprises a transducer or actuator-displacement detecting means 47A that is provided to detect the displacement of the actuator 30A. The displacement detecting means 47A includes a rod 47Aa projectable therefrom and retractable therein and an arm member 47Ab fixed at one end thereof to the rod 47Aa and at the other end thereof to the piston rod 33A of the actuator 30A. As the actuator 30A is driven by the supply of the hydraulic working oil, the rod 47Aa of the displacement detecting means 47A is moved together with the piston rod 33A of the actuator 30A. Thus, the displacement detecting means 47A serves to detect the displacement of the actuator 30A from that of the rod 47Aa and to convert that displacement into an electrical signal and outputs the signal to the actuator-controlling circuit 39B of the second servomechanism 50B shown in FIG. 2.

The aforesaid actuator-controlling circuit 39A, fault-detecting control circuit 41A, first switch 42A, power source 43A and second switch 42A' as a whole constitute the electrical control circuit 49A for controlling the servo hydraulic circuit 48A. The electrical control circuit 49A serves to detect the faults in the servo hydraulic circuit 48A and in the hydraulic working oil source 35A by means of the fault-detecting control circuit 41A, and to switch the first switch 42A on and off. When the servo hydraulic circuit 48A and hydraulic working oil source 35A are in normal operation, the electrical control circuit 49A closes the switch 42A and outputs a signal to the switch valve 36A, so that the working oil is supplied from the hydraulic working oil source 35A to the servo valve 37A through the switch valve 36A. In addition, in order to drive the actuator 30A, the electrical control circuit 49A serves to output a signal to the servo valve 37A by means of the actuator-controlling circuit 39A, and to supply the hydraulic working oil, which is supplied from the switch valve 36A, to the actuator 30A through the bypass valve 38A, which is in the position V at the time of normal operation. Furthermore, in order to stop the actuator 30A to a predetermined position, the electrical control circuit 49A serves to receive the displacement signal from the displacement detecting means 47A by means of the actuator-controlling circuit 39A and to output a signal to the servo valve 37A so that the servo valve 37A is shifted to the neutral position N, to interrupt the supply of the working oil to the actuator 30A. It is noted that if the first switch 42A is opened, the second switch 42A' is closed, and if the first switch 42A is closed, the second switch 42A' is opened. Reference numeral 51A denotes a main switch for the actuator-controlling circuit 39A.

The operation of the embodiment shown in FIG. 2 will hereinafter be described in detail.

When the control apparatus is in normal operation, according to the command of the pilot stick or flight computer, the actuator-controlling circuits 39A and 39B of the first and second servomechanisms 50A and 50B receive the signals from the actuator-displacement detecting means 47A and 47B, respectively, and output actuator-displacement signals to the servo valves 37A and 37B. The servo valves 37A and 37B respectively drive the actuators 30A and 30B of the first and second servomechanisms 50A and 50B, and the control surface 34 is thus driven and controlled concurrently by means of a pair of the first and second servomechanisms 50A and 50B. Since the first switches 42A and 42B respectively provided in the fault-detecting control circuits 41A and 41B are both closed at the time of normal operation, the hydraulic working oils are supplied through the switch valves 36A and 36B to the servo valves 37A and 37B, respectively, and also both the bypass valves 38A and 38B are shifted to the positions V and V, respectively, in which the hydraulic working oils are supplied through the servo valves 37A and 37B to the actuators 30A and 30B, by the pilot pressures in the switch valves 36A and 36B. As a result, the hydraulic working oils are supplied the actuators 30A and 30B, respectively.

In the event of a fault in the first servomechanism 50A, the fault-detecting control circuit 41A of tee first servomechanism 50A detects the fault and opens the first switch 42A to interrupt the transmission of signal to the switch valve 36A. As a result, since the switch valve 36A is shifted to the position IV, wherein the hydraulic working oil is cut off, by means of the spring 36A and since the supply of working oil to the actuator 30A is interrupted, the actuator 30A is stopped. The bypass valve 38A is also shifted to the position VI by means of the spring 38Aa, and thus the cylinder chambers 31Aa and 31Ab of the actuator 30A are communicated with each other through the bypass conduit 45A. At the same time, the second switch 42A' of the electrical control circuit 49A is closed, the solenoid 46Aa of the control valve 46A is electrically connected through the first switch 42B to the power source 43B of the second servomechanism 50B, the control valve 46A is shifted to the position VII to allow the entire working oil to pass therethrough, and the first servomechanism 50A releases the control of the control surface 34. Accordingly, since the piston 32A of the actuator 30A of the first servomechanism 50A is able to move freely, the damaged first servomechanism 50A will not have an unfavorable effect on the normal control of the control surface 34 being controlled by the second servomechanism 50B.

In the event that, following the fault in first servomechanism 50A, the second servomechanism 50B was damaged, viz., in the event of faults in both the first and second servomechanisms 50A and 50B, the fault-detecting control circuit 41B of the second servomechanism 50B detects the faults and opens the first switch 42B to interrupt the transmission of signal to the switch valve 36B. As a result, since the supply of working oil to the actuator 30B is interrupted, the actuator 30B is stopped. At the same time, the solenoid 46Aa of the control valve 46A of the first servomechanisms 50A, which was connected through the switches 42A' and 42B to the power source 43B of the second servomechanism 50B, is disconnected from the power source 43B, and thus the control valve 46A is shifted to the position VIII, in which the flow of the bypass conduit 45A is choked or restricted, by means of the spring 46Ab. Therefore, in the case all the servomechanisms (in this embodiment of FIG. 2, a pair of first and second servomechanisms 50A and 50B) were damaged, the signals of the electric control circuits 49A and 49B to the control valves 46A and 46B are interrupted and thus both the control valves 46A and 46B are shifted to the position VIII wherein the flow of the bypass conduit is choked or restricted. At a consequence of the restricted flow in the control valves 46A and 46B, there occurs damper effect which regulates the free motion of the control surface 34. Accordingly, the vibration of the control surface 34 is automatically prevented without a mass-balance weight or damper, and the fluttering phenomenon can be prevented.

As previously indicated, in the embodiment of FIG. 2, the control valves 46A and 46B are provided in by-pass conduits 45A and 45B which are provided in the servomechanisms 50A and 50B, respectively, and if either one of the servomechanisms 50A and 50B was damaged, the control valve in the bypass conduit of the damaged servomechanism is fully opened so that the piston of the actuator is able to move freely in accordance with the motion of the control surface being controlled by the other servomechanism, and if both the servomechanisms 50A and 50B were damaged, the flows in both the control valves 46A and 46B are restricted so that the motions of the pistons of both the actuators are regulated. For this reason, the vibration of the control surface 34, which causes the fluttering phenomenon, is automatically prevented without a mass-balance weight or damper. As a result, in accordance with the embodiment of FIG. 2, the weight of the aircraft can be reduced and furthermore the mechanical efficiency in the control of the control surface can be enhanced.

While the embodiment shown in FIG. 2 has been illustrated and described in conjunction with the case that the second servomechanism was damaged after the first servomechanism had been damaged, it is noted that, even in the case the first servomechanism was damaged after the second servomechanism had been damaged and even in the case both servomechanisms were damaged concurrently, the same effect as the aforesaid embodiment can be obtained.

Figure 3:
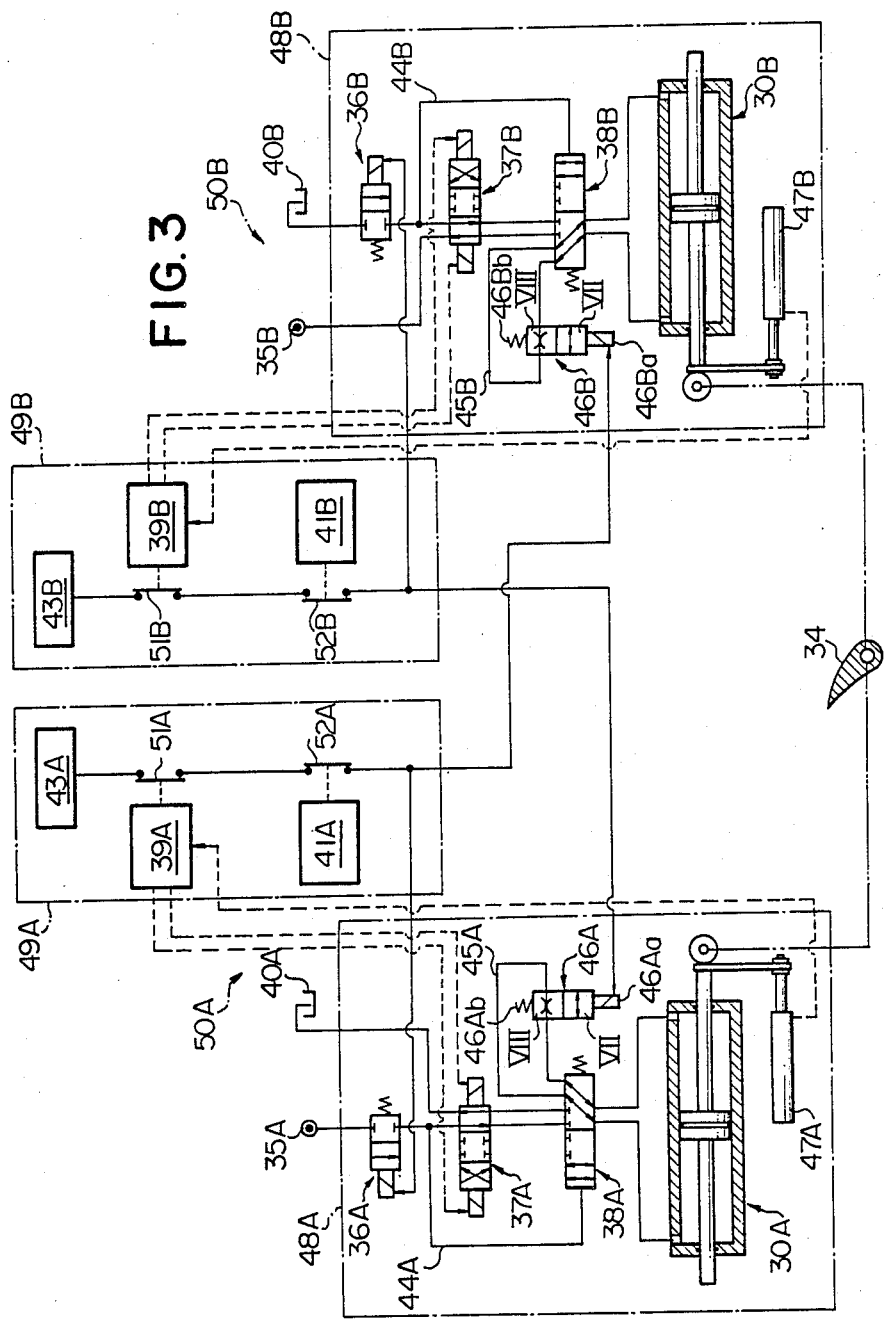
FIG. 3 is a view similar to FIG. 2 showing another embodiment according to the present invention.

Referring to FIG. 3, there is shown another embodiment according to the present invention.

The portions substantially identical in construction and operation to those of the embodiment shown in FIG. 2 are designated by like reference numerals to avoid the detailed description. This embodiment comprises a pair of first and second servomechanisms 50A and 50B which both drive and control a control surface or aileron 34 of aircraft at the time of normal operation, as in the case of the embodiment of FIG. 2. In the embodiment of FIG. 3, first and second switches 52A and 52B are provided in fault-detecting control circuits 41A and 41B of the first and second servomechanisms 50A and 50B, respectively, a solenoid 46Aa of a control valve 46A of the first servomechanism 50A is electrically connected through the second switch 52B to a power source 43B of the second servomechanism 50B, and a solenoid 46Ba of a control valve 46B of the second servomechanism 50B is electrically connected through the first switch 52A to a power source 43A of the first servomechanism 50A.

Even in the event of a fault in either one of the first and second servomechanisms 50A and 50B, for example, even in the event of a fault in the first servomechanism 50A, the servomechanism 50A will not have an unfavorable effect on the normal operation of the second servomechanism 50B, because the solenoid 46Aa of the control valve 46A is connected to the power source 43B and because the control valve 46A of the first servomechanism 50A is still held in the position VII thereof wherein the working oil is allowed to pass through the control valve 46A. In addition, in the event both the first and second servomechanisms 50A and 50B were damaged, the switches 52A and 52B are opened and therefore the control valves 46A and 46B of the first and second servomechanisms 50A and 50B are shifted to the positions VIII wherein the flow is choked or restricted, thereby preventing the fluttering phenomenon of the control surface 34. Accordingly, the switches provided in the fault-detecting control circuits 41A and 41B can be simply constructed as compared with those of the embodiment shown in FIG. 2. That is, each fault-detecting control circuit of the embodiment of FIG. 3 requires only one switch, while that of FIG. 2 requires two switches.

Figure 4:
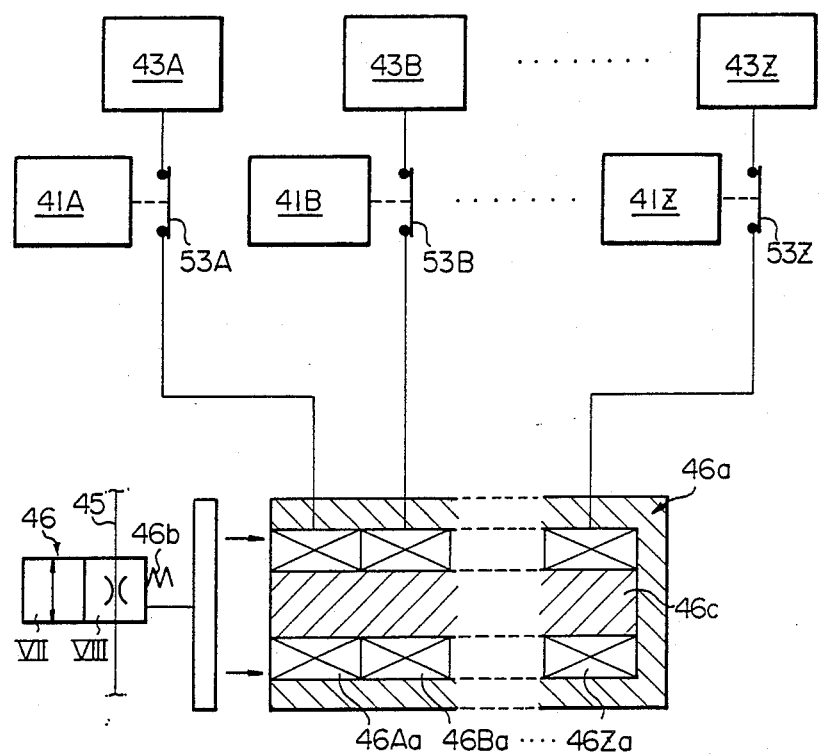
FIG. 4 is a view similar to FIG. 2 showing a third embodiment according to the present invention.
Figure 5:
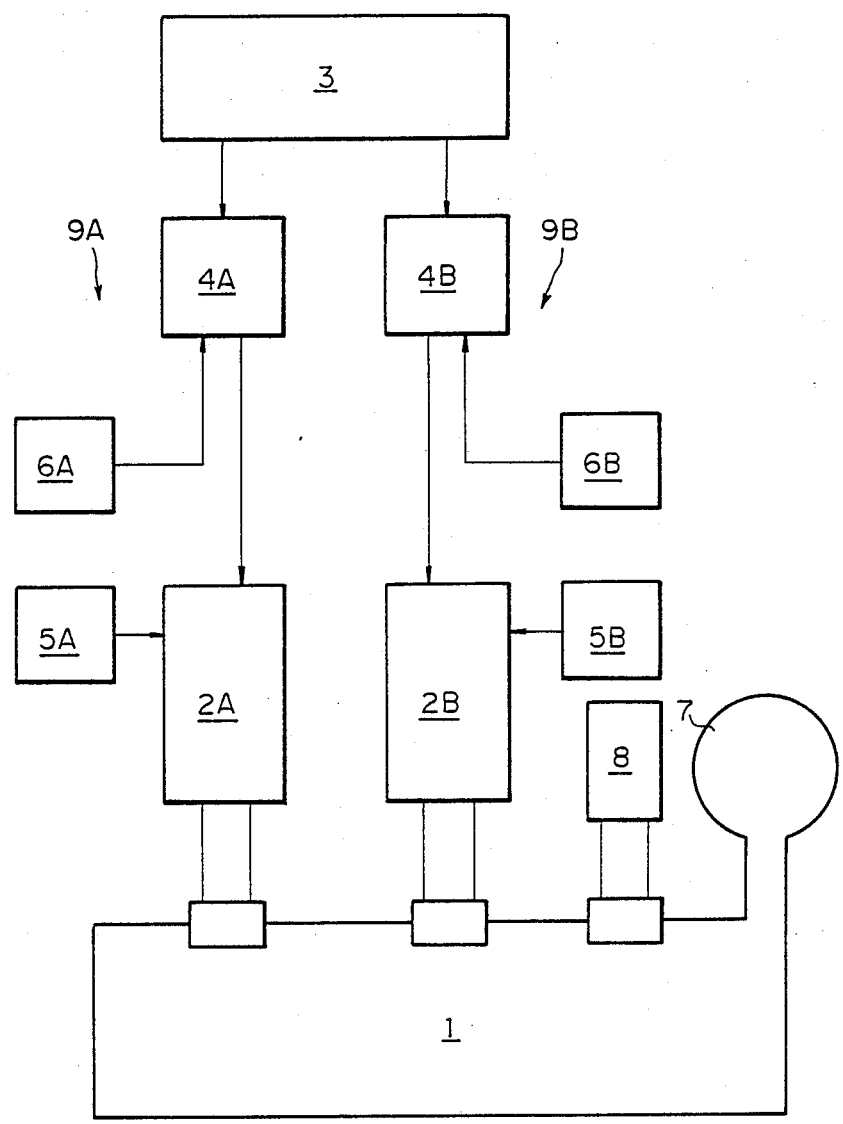
FIG. 5 is a schematic diagram representing an overall construction of a conventional control apparatus of a control surface of aircraft.
Figure 6:
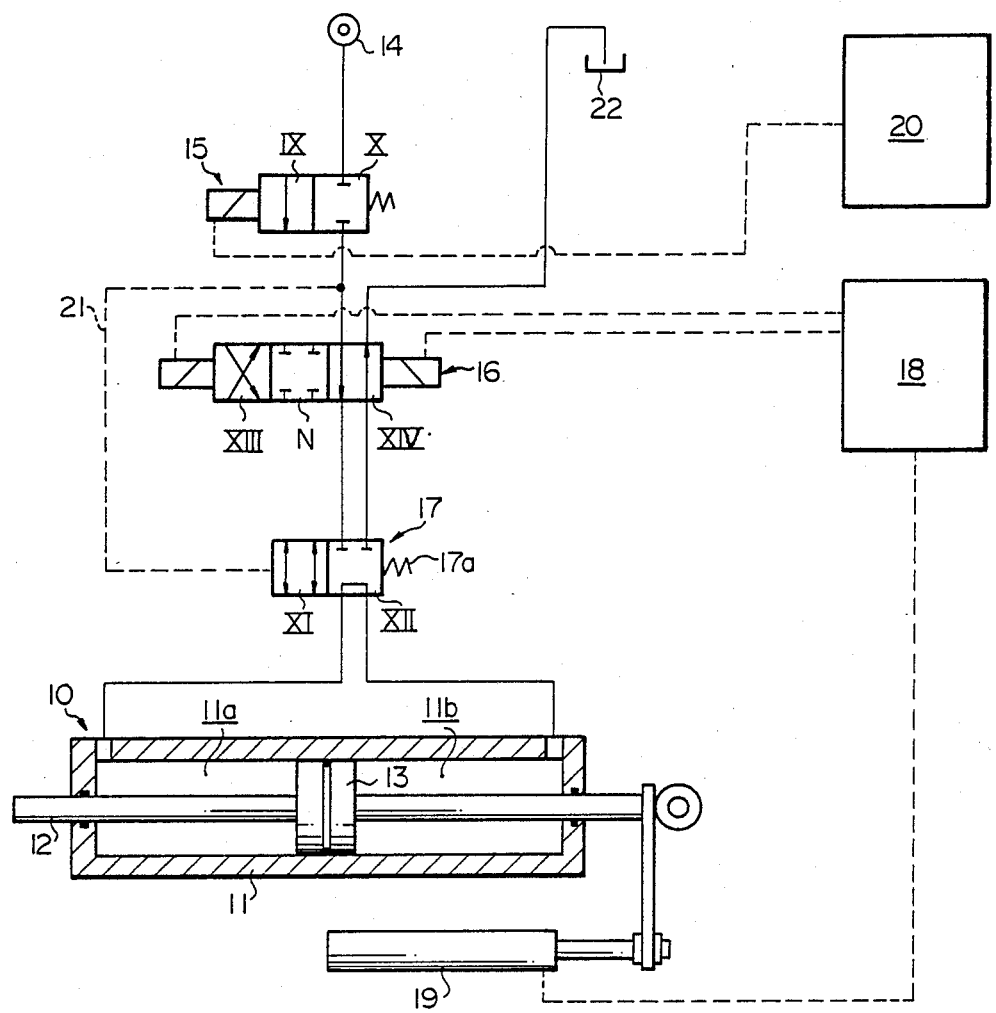
FIG. 6 is a schematic view representing a hydraulic servomechanism used in a conventional control apparatus of a control surface of aircraft.

Referring to FIG. 4, there is shown the third embodiment of the present invention. The portions substantially identical in construction and operation to those of the embodiment shown in FIG. 2 are designated by like reference numerals to avoid the detailed description. The third embodiment of FIG. 4 comprises a plurality of servomechanisms 50A, 50B, ..., and 50Z (not shown). In this embodiment, the solenoid 46a of the control valve 46 of each servomechanism comprises solenoids 46Aa, 46Ba, ..., and 46Za which are wound around the core 46c in the recited order. The solenoids 46Aa, 46Ba, ..., and 46Za are electrically connected to the power sources 43A, 43B, ..., and 43Z of the corresponding servomechanisms 50A, 50B, ..., and 50Z through the switches 53A, 53B, ..., and 53Z provided in the fault-detecting control circuits 41A, 41B, ..., and 41Z, respectively. Therefore, even if either one of the servomechanisms 50A, 50B, ..., and 50Z, for example, the servomechanism 50A is damaged, the corresponding fault-detecting control circuits 41A opens the switch 53A, the solenoid 46a of the servomechanism 50A is actuated by the other solenoids 46Ba, 46Ca, ..., and 46Za, and therefore the control valve is shifted to the position VII thereof. Consequently, the servomechanism 50A will not have an unfavorable effect on the operations of the other normal servomechanisms 50B, 50C, ..., and 50Z. Also, even if the number of faults in the servomechanisms were increased, the damaged servomechanisms would not interfere with the operations of the other normal servomechanisms, because the control valves of the damaged servomechanisms are shifted to the positions VII by the other normal servomechanisms. Furthermore, in the case all the servomechanisms are damaged, all the control valves are shifted to the positions VIII wherein the flow of working oil is choked or restricted, to regulate the motions of the pistons of the actuators, and therefore the fluttering phenomenon of the control surface 34 can be prevented.

From the foregoing description, it will be seen that, in accordance with the present invention, there is provided a control apparatus of a control surface of aircraft in which the weight of the aircraft is reduced and the mechanical efficiency in the control of the control surface is enhanced.

While certain representative embodiments and details have been shown for the purpose of illustrating the present invention, it will be apparent to those skilled in this art that various changes and modifications may be made therein without departing from the spirit or scope of the invention.

What I claim is:

1. A control apparatus for controlling a control surface of an aircraft having at least two servomechanisms each including:

a hydraulic working oil source for supplying working oil under pressure;

an actuator for driving said control surface, said actuator having at least two chambers and being connected to said control surface;

a bypass valve interposed between said hydraulic working oil source and said actuator and shiftable between a first position thereof, in which said working oil is supplied to said actuator, and a second position thereof, in which said working oil is cut off and said chambers are held in fluid communication with each other through a bypass conduit connected to said bypass valve thereby releasing the control of said control surface; and a control valve provided in said bypass conduit of said bypass valve and shiftable between a first position, in which the entire working oil in said bypass conduit is allowed to pass through said control valve so that said control surface becomes freely movable, and a second position thereof, in which said working oil in said bypass conduit is restricted so as to regulate the motion of said control surface connected to said actuator, whereby when one of said servomechanisms is damaged, the control of said control surface by said damaged servomechanism being released by shifting said bypass valve in dais damaged servomechanism to said second position thereof by said damaged servomechanism and said control valve in said other servomechanism to said first position thereof by the other servomechanism, and whereby when all said servomechanisms are damaged, the free motion of said control surface is regulated by shifting said bypass valve and said control valve in all said servomechanisms to said second position of said bypass valve and said second position of said control valve, respectively.

2. A control apparatus of a control surface of an aircraft comprising first and second servomechanisms each including:

a hydraulic working oil source for supplying working oil under pressure;

an actuator for driving said control surface, said actuator having a piston slidably received in a cylinder, and a piston rod fixed to said piston, the cylinder being divided into a pair of first and second cylinder chambers by said piston, the actuator being connected through said piston rod to said control surface;

a servo valve for controlling said control surface said servo valve being shiftable between a first position thereof, in which said working oil is supplied to either one of said pair of cylinder chambers to change a driving direction of said actuator, and a second position, in which supply of said working oil to said actuator is interrupted to stop the drive of said actuator;

a switch valve interposed between said hydraulic working oil source and said servo valve and shiftable between a first position thereof, in which said working oil from said hydraulic working oil source is supplied to said servo valve, and a second position thereof, in which the supply of said working oil is cut off;

a bypass valve interposed between said servo valve and said actuator, actuated by means of a pilot pressure in said switch valve introduced thereto through a pilot conduit between said switch valve and said bypass valve, and shiftable between a first position thereof, so that when said switch valve is shifted to said first position thereof, said working oil from said servo valve is supplied to said actuator, and a second position thereof, so that when said switch valve is shifted to said second position, said working oil from said servo valve is cut off and said first and second cylinder chambers are held in fluid communication with each other through a bypass conduit connected to said bypass valve thereby releasing the control of said control surface;

a control valve provided in said bypass conduit of said bypass valve and shiftable between a first position, in which the entire working oil in said bypass conduit is allowed to pass through said control valve so that said control surface becomes freely movable, and a second position thereof, in which said working oil in said bypass conduit is restricted so as to regulate the motion of said control surface connected to said piston rod of said actuator; and a control circuit for outputting to said switch valve a first control signal for cutting off the supply of said working oil and for outputting to said control valve a second control signal for shifting said control valve to said first position thereof and a third control signal for shifting said control valve to said second position thereof, whereby when either one of said servomechanisms is damaged, the control of said control surface by said damaged servomechanism being released by outputting said first control signal of said control circuit of said one damaged servomechanism to said switch valve of said one damaged servomechanism and outputting said second control signal of said control circuit of the other servomechanism to said control valve of said one damaged servomechanism, and whereby when both first and second servomechanisms are damaged, the free motion of said control surface being regulated by outputting said first control signal of said first servomechanism to said switch valve of said first servomechanism and said third control signal of said second servomechanism to said control valve of said first servomechanism and by outputting said first control signal of said second servomechanism to aid switch valve of said second servomechanism signal of said first servomechanism to said control valve of said second servomechanism.

3. A control apparatus as set forth in claim 2, in which said switch valve is provided with a solenoid and said control valve is provided with a solenoid, and in which said control circuit comprises a power source, a first switch, and a second switch which is opened and closed when said first switch is closed and opened, respectively, the solenoid of said switch valve of said first servomechanism being electrically connected through said first switch of said first servomechanism to said power source of said first servomechanism, and the solenoid of said control valve of said first servomechanism being electrically connected through said second switch of said first servomechanism and through said first switch of said second servomechanism to said power source of said second servomechanism.

4. A control apparatus as set forth in claim 2, in which said switch valve is provided with a solenoid and said control valve is provided with a solenoid, and in which said control circuit comprises a power source and a switch, the solenoid of said switch valve of said first servomechanism being electrically connected through said switch of said first servomechanism to said power source of said first servomechanism, and the solenoid of said control valve of said first servomechanism being electrically connected through said switch of said second servomechanism to said power source of said second servomechanism.

5. A control apparatus of a control surface of an aircraft having at least two servomechanisms each including:

a hydraulic working oil source for supplying working oil under pressure;

an actuator for driving said control surface said actuator having a piston slidably received in a cylinder, and a piston rod fixed to said piston, the cylinder being divided into a pair of cylinder chambers by said piston, the actuator being connected through said piston rod to said control surface;

a servo valve for controlling said control surface which is shiftable between a first position thereof, in which said working oil is supplied to either one of said pair of cylinder chambers to change a driving direction of said actuator, and a second position, in which supply of said working oil to said actuator is interrupted to stop the drive of said actuator;

a switch valve interposed between said hydraulic working oil source and said servo valve and shiftable between a first position thereof, in which said working oil form said hydraulic working oil source is supplied to said servo valve, and a second position thereof, in which the supply of said working oil is cut off;

a bypass valve interposed between said servo valve and said actuator, actuated by means of a pilot pressure in said switch valve introduced thereto through a pilot conduit between said switch valve and said bypass valve, and shiftable between a first position thereof, in which when said switch valve is shifted to said first position thereof, said working oil from said servo valve is supplied to said actuator, and a second position thereof, so that when said switch valve is shifted to said second position, said working oil from said servo valve is cut off and said first and second cylinder chambers are held in fluid communication with each other through a bypass conduit connected to said bypass valve in order to release the control of said control surface;

a control valve provided in said bypass conduit of said bypass valve and shiftable between a first position, in which the entire working oil in said bypass conduit is allowed to pass through said control valve so that said control surface becomes freely movable, and a second position thereof, in which said working oil in said bypass conduit is restricted so as to regulate the motion of said control surface connected to said piston rod of said actuator; and a control circuit for outputting to said switch valve a first control signal for cutting off the supply of said working oil and for outputting to said control valve a second control signal for shifting said control valve to said first position thereof and a third control signal for shifting said control valve to said second position thereof;

whereby when either one of said servomechanisms is damaged, the control of said control surface by said damaged servomechanism being released by outputting said first control signal of said control circuit of said one damaged servomechanism to said switch valve of said one damaged servomechanism and outputting said second control signal of said control circuit of the other servomechanism to said control valve of said one damaged servomechanism; and whereby when all said servomechanisms are damaged, the free motion of said control surface being regulated by shifting the control valve to the second position thereof in all said servomechanisms.

6. A control apparatus as set forth in claim 5, in which said control valve of each servomechanism is provided with a solenoid, and in which said control circuit of each servomechanism comprises a power source and a switch, and in which said solenoid of said control valve of each servomechanism is constituted by a plurality of solenoids corresponding in number to said plurality of said servomechanisms, the respective solenoid of said plurality of solenoids being connected electrically through the corresponding switch to the corresponding power source.

* * * * *